US012683769B2

(12) United States Patent
Yeo et al.

(10) Patent No.: US 12,683,769 B2
(45) Date of Patent: ***Jul. 14, 2026

(54) ENCRYPTED SEARCH WITH A PUBLIC KEY

(71) Applicant: Google LLC, Mountain View, CA (US)

(72) Inventors: Kevin Yeo, Mountain View, CA (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,108

(22) Filed: Apr. 18, 2023

(65) Prior Publication Data

US 2023/0254126 A1 Aug. 10, 2023

Related U.S. Application Data

(63) Continuation of application No. 16/712,487, filed on Dec. 12, 2019, now Pat. No. 11,902,425.

(51) Int. Cl.
*H04L 9/08* (2006.01)
*G06F 16/903* (2019.01)
(Continued)

(52) U.S. Cl.
CPC ........ *H04L 9/0825* (2013.01); *G06F 16/9032* (2019.01); *G06F 16/90335* (2019.01);
(Continued)

(58) Field of Classification Search
CPC ... H04L 9/0825; H04L 9/0631; H04L 9/0637; H04L 9/0866; H04L 9/0869;
(Continued)

(56) References Cited

U.S. PATENT DOCUMENTS 6,785,889 B1 8/2004 Williams
8,209,701 B1 6/2012 Roytman et al.
(Continued)

FOREIGN PATENT DOCUMENTS

CN 105450387 A 3/2016
CN 109522681 A 3/2019
(Continued)

OTHER PUBLICATIONS

European Search Report for the related Application No. 23172647.2 dated Aug. 30, 2023, 11 pages.
(Continued)

*Primary Examiner* — Fatoumata Traore
*Assistant Examiner* — Carlton Johnson
(74) *Attorney, Agent, or Firm* — Honigman LLP; Brett A. Krueger

(57) ABSTRACT

A method for searchable encryption with a public key includes receiving an operation request from a user device associated with a user requesting that encryption of data associated with the user. The data includes a corpus of documents stored on a remote storage device. The method also includes receiving a public key associated with the user. The public key includes an asymmetric cryptographic public key. The method also includes generating a random data key. The data key includes a symmetric cryptographic key. The method also includes encrypting, using the data key, a search index for the corpus of documents based on keywords within the corpus of documents. The method also includes encrypting, using the public key, the data key and sending the encrypted data key to a user device associated with the user.

20 Claims, 5 Drawing Sheets

(51) Int. Cl.

| | | |
|---|---|---|
| *G06F 16/9032* | (2019.01) | |
| *G06F 16/93* | (2019.01) | |
| *H04L 9/06* | (2006.01) | |

(52) U.S. Cl.

CPC ............ *G06F 16/93* (2019.01); *H04L 9/0631* (2013.01); *H04L 9/0637* (2013.01); *H04L 9/0866* (2013.01); *H04L 9/0869* (2013.01)

(58) Field of Classification Search

CPC .............. H04L 2463/062; H04L 63/06; H04L 63/0442; H04L 67/1097; G06F 16/9032; G06F 16/90335; G06F 16/93; G06F 21/602; G06F 21/6209

See application file for complete search history.

(56) References Cited

U.S. PATENT DOCUMENTS

| | | | |
|---|---|---|---|
| 8,442,994 | B1 | 5/2013 | Chen et al. |
| 8,583,799 | B2 | 11/2013 | Podila |
| 8,621,476 | B2 | 12/2013 | Youn et al. |
| 8,640,137 | B1 | 1/2014 | Bostic et al. |
| 8,909,943 | B1 | 12/2014 | Shankar et al. |
| 8,997,109 | B2 | 3/2015 | Lee et al. |
| 9,294,236 | B1 | 3/2016 | Ward, Jr. |
| 9,336,042 | B1 | 5/2016 | Brenneman et al. |
| 9,430,280 | B1 | 8/2016 | Shih et al. |
| 9,612,878 | B2 | 4/2017 | Di Balsamo et al. |
| 9,633,219 | B2 | 4/2017 | Baessler et al. |
| 9,886,311 | B2 | 2/2018 | Miller et al. |
| 10,037,435 | B2 | 7/2018 | Baessler et al. |
| 10,152,449 | B1 | 12/2018 | Ward, Jr. |
| 10,218,639 | B2 | 2/2019 | Kandula et al. |
| 10,275,611 | B1 * | 4/2019 | Yu ........................... G06F 16/33 |
| 10,789,557 | B2 | 9/2020 | Mulla et al. |
| 2003/0028642 | A1 | 2/2003 | Agarwal et al. |
| 2005/0021349 | A1 | 1/2005 | Cheliotis et al. |
| 2005/0207439 | A1 | 9/2005 | Iyengar et al. |
| 2005/0268299 | A1 | 12/2005 | Picinich et al. |
| 2006/0010323 | A1 * | 1/2006 | Martin ...................... H04L 9/30 |
| | | | 713/171 |
| 2007/0136731 | A1 | 6/2007 | Bennington et al. |
| 2007/0240161 | A1 | 10/2007 | Prabhakar et al. |

| | | | |
|---|---|---|---|
| 2008/0008085 | A1 | 1/2008 | Gerstel |
| 2008/0059553 | A1 | 3/2008 | Dawson et al. |
| 2008/0066072 | A1 | 3/2008 | Yurekli et al. |
| 2008/0115143 | A1 | 5/2008 | Shimizu et al. |
| 2009/0025004 | A1 | 1/2009 | Barnard et al. |
| 2009/0172655 | A1 | 7/2009 | Ivanov |
| 2010/0306221 | A1 | 12/2010 | Lokam et al. |
| 2010/0325637 | A1 | 12/2010 | Radmilac et al. |
| 2011/0154353 | A1 | 6/2011 | Theroux et al. |
| 2012/0131591 | A1 | 5/2012 | Moorthi et al. |
| 2012/0173299 | A1 | 7/2012 | McMullin |
| 2012/0284077 | A1 | 11/2012 | Xiao et al. |
| 2013/0117454 | A1 | 5/2013 | Rangarajan et al. |
| 2013/0179371 | A1 | 7/2013 | Jain et al. |
| 2014/0006993 | A1 | 1/2014 | Deluca et al. |
| 2014/0025796 | A1 | 1/2014 | Vibhor et al. |
| 2014/0075222 | A1 | 3/2014 | Jackson |
| 2015/0039552 | A1 | 2/2015 | Moyne |
| 2015/0149999 | A1 | 5/2015 | Ramanathan et al. |
| 2015/0150016 | A1 | 5/2015 | Kim |
| 2015/0264135 | A1 | 9/2015 | Kandula et al. |
| 2015/0331715 | A1 | 11/2015 | Sathyanarayana |
| 2016/0299924 | A1 * | 10/2016 | Fujimoto ............ G06F 16/2455 |
| 2017/0109199 | A1 | 4/2017 | Chen |
| 2017/0244784 | A1 | 8/2017 | Lam et al. |
| 2017/0300364 | A1 | 10/2017 | Liu et al. |
| 2018/0054316 | A1 * | 2/2018 | Tomlinson ............ H04L 9/3242 |
| 2018/0095738 | A1 | 4/2018 | Durkop et al. |
| 2018/0124026 | A1 | 5/2018 | Dawoud |
| 2019/0318102 | A1 * | 10/2019 | Araya ................... H04L 9/0897 |
| 2020/0036531 | A1 * | 1/2020 | Minovic ............... H04L 9/3236 |

FOREIGN PATENT DOCUMENTS

| | | | | | |
|---|---|---|---|---|---|
| EP | | 3796200 | B1 * | 3/2023 | ......... G06F 12/1408 |
| WO | WO-2016202089 | A1 * | 12/2016 | | |

OTHER PUBLICATIONS

International Search Report, Application No. PCT/US2020/064694, Apr. 6, 2021, 15 pages.

Pham et al., "Survey on Secure Search Over Encrypted Data on the Cloud," Nov. 24, 2018, 19 pages.

\* cited by examiner

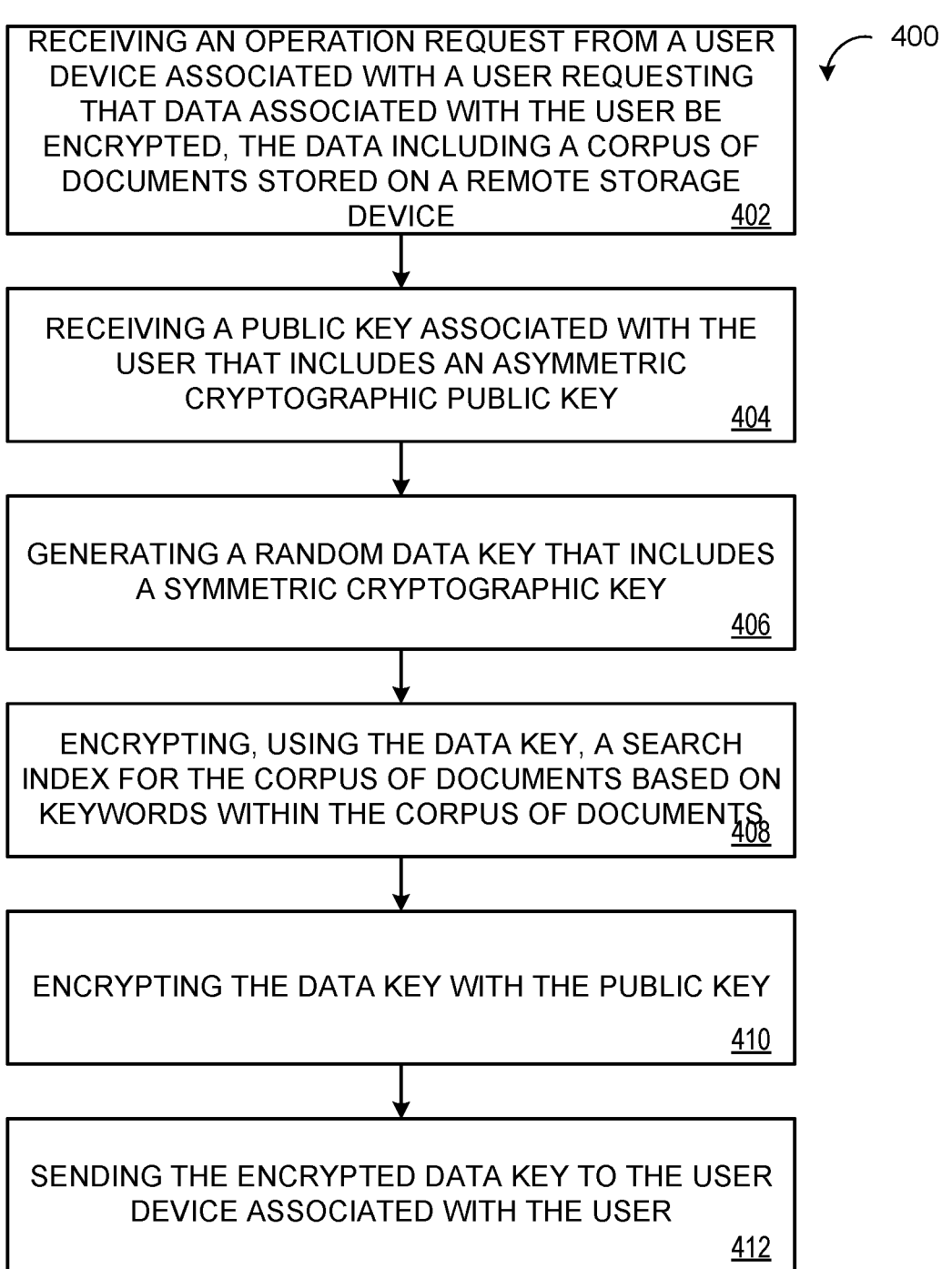

400

RECEIVING AN OPERATION REQUEST FROM A USER
DEVICE ASSOCIATED WITH A USER REQUESTING
THAT DATA ASSOCIATED WITH THE USER BE
ENCRYPTED, THE DATA INCLUDING A CORPUS OF
DOCUMENTS STORED ON A REMOTE STORAGE
DEVICE                                    402

RECEIVING A PUBLIC KEY ASSOCIATED WITH THE
USER THAT INCLUDES AN ASYMMETRIC
CRYPTOGRAPHIC PUBLIC KEY
                                          404

GENERATING A RANDOM DATA KEY THAT INCLUDES
A SYMMETRIC CRYPTOGRAPHIC KEY
                                          406

ENCRYPTING, USING THE DATA KEY, A SEARCH
INDEX FOR THE CORPUS OF DOCUMENTS BASED ON
KEYWORDS WITHIN THE CORPUS OF DOCUMENTS
                                          408

ENCRYPTING THE DATA KEY WITH THE PUBLIC KEY

410

SENDING THE ENCRYPTED DATA KEY TO THE USER
DEVICE ASSOCIATED WITH THE USER
                                          412

FIG. 4

ENCRYPTED SEARCH WITH A PUBLIC KEY

CROSS-REFERENCE TO RELATED APPLICATIONS

This U.S. patent application is a continuation of, and claims priority under 35 U.S.C. § 120 from, U.S. patent application Ser. No. 16/712,487, filed on Dec. 12, 2019. The disclosure of this prior application is considered part of the disclosure of this application and is hereby incorporated by reference in its entirety.

TECHNICAL FIELD

This disclosure relates to performing encrypted searches using a public key.

BACKGROUND

Searchable encryption (i.e., encrypted search) has increased in popularity as storage of large quantities of data in the cloud becomes more common. More and more, a user or client owns a large corpus of encrypted documents that are stored at a server not under the client's control (i.e., the server is untrusted). With searchable encryption, the client can store their encrypted documents on the untrusted server, but still maintain the capability of searching the documents and, for example, retrieve identifiers of all documents containing a specific keyword. However, encrypting the data with public key encryption, while popular due to its security, is computationally expensive.

SUMMARY

One aspect of the disclosure provides a method for encrypted search with a public key. The method includes receiving, at data processing hardware, an operation request from a user device associated with a user, the operation request requesting encryption of data associated with the user. The data includes a corpus of documents stored on a remote storage device in communication with the data processing hardware. The method also includes receiving, at the data processing hardware, a public key associated with the user. The public key includes an asymmetric cryptographic public key. The method also includes generating, by the data processing hardware, a random data key. The data key includes a symmetric cryptographic key. The method also includes encrypting, by the data processing hardware, using the data key, a search index for the corpus of documents based on keywords within the corpus of documents. The method also includes encrypting, by the data processing hardware, using the public key associated with the user, the data key and sending, by the data processing hardware, the encrypted data key to the user device associated with the user.

Implementations of the disclosure may include one or more of the following optional features. In some implementations, receiving the public key associated with the user includes receiving the public key from the user device concurrently with receiving the operation request. Optionally, the method further includes, prior to receiving the operation request, receiving, at the data processing hardware, the corpus of documents uploaded by the user device and storing, by the data processing hardware, the corpus of documents uploaded by the user device. The method may also include generating, by the data processing hardware, the search index for the corpus of documents stored on the remote storage device based on the keywords within the corpus of documents.

In some implementations, the method further includes, after sending the encrypted data key to the user, discarding, by the data processing hardware, the data key. In some examples, the user device is configured to decrypt the encrypted data key using a private key associated with the public key, and the private key is inaccessible to the data processing hardware. The private key includes an asymmetric cryptographic private key. The user device may also be configured to generate, based on the decrypted data key, a search query for a keyword appearing in one or more of the documents within the corpus of documents.

In some implementations, the method includes receiving, at the data processing hardware, the search query for the keyword from the user device. The method may also include accessing, by the data processing hardware, using the search query, the encrypted search index to generate a searchable encryption result associated with a list of document identifiers. Each document identifier in the list of document identifiers uniquely identifies a respective one of the documents within the corpus of documents that the keyword appears in. The method may also include returning, by the data processing hardware, the searchable encryption result to the user device.

In some examples, the list of document identifiers associated with the searchable encryption result are never revealed to the data processing hardware in plaintext. In some implementations, the searchable encryption result, when received by the user device, causes the user device to obtain the list of document identifiers in plaintext using the decrypted data key. In some examples, the method further includes, prior to encrypting the random data key with the public key, encrypting, by the data processing hardware, using the random data key, the corpus of documents.

In some implementations, the method further includes, in response to receiving the operation request, generating, by the data processing hardware, another random data key, the other random data key including another symmetric cryptographic key and encrypting, by the data processing hardware, using the public key associated with the user, the other random data key. The data key may include an Advanced Encryption Standard Galois/Counter Mode (AES-GCM) key.

Another aspect of the disclosure provides a system for providing searchable encryption with a public key. The system includes data processing hardware and memory hardware in communication with the data processing hardware. The memory hardware stores instructions that when executed on the data processing hardware cause the data processing hardware to perform operations. The operations include receiving an operation request from a user device associated with a user, the operation request requesting encryption of data associated with the user. The data includes a corpus of documents stored on a remote storage device in communication with the data processing hardware. The operations also include receiving a public key associated with the user. The public key includes an asymmetric cryptographic public key. The operations also include generating a random data key. The data key includes a symmetric cryptographic key. The operations also include encrypting using the data key, a search index for the corpus of documents based on keywords within the corpus of documents. The operations also include encrypting using the public key associated with the user, the data key and sending the encrypted data key to the user device associated with the user.

Implementations of the disclosure may include one or more of the following optional features. In some implementations, receiving the public key associated with the user includes receiving the public key from the user device concurrently with receiving the operation request. Optionally, the operations further include, prior to receiving the operation request, receiving the corpus of documents uploaded by the user device and storing the corpus of documents uploaded by the user device. The operations may also include generating the search index for the corpus of documents stored on the remote storage device based on the keywords within the corpus of documents.

In some implementations, the operations further include, after sending the encrypted data key to the user, discarding the data key. In some examples, the user device is configured to decrypt the encrypted data key using a private associated with the public key, and the private key is inaccessible to the data processing hardware. The private key includes an asymmetric cryptographic private key. The user device may also be configured to generate, based on the decrypted data key, a search query for a keyword appearing in one or more of the documents within the corpus of documents.

In some implementations, the operations include receiving the search query for the keyword from the user device. The operations may also include accessing, using the search query, the encrypted search index to generate a searchable encryption result associated with a list of document identifiers. Each document identifier in the list of document identifiers uniquely identifies a respective one of the documents within the corpus of documents that the keyword appears in. The operations may also include returning the searchable encryption result to the user device.

In some examples, the list of document identifiers associated with the searchable encryption result are never revealed to the data processing hardware in plaintext. In some implementations, the searchable encryption result, when received by the user device, causes the user device to obtain the list of document identifiers in plaintext using the decrypted data key. In some examples, the operations further include, prior to encrypting the random data key with the public key, encrypting, using the random data key, the corpus of documents.

In some implementations, the operations further include, in response to receiving the operation request, generating another random data key, the other random data key including another symmetric cryptographic key and encrypting, using the public key associated with the user, the other random data key. The data key may include an Advanced Encryption Standard Galois/Counter Mode (AES-GCM) key.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4 is a flowchart of an example method for providing searchable encryption with a public key.

Like reference symbols in the various drawings indicate like elements.

DETAILED DESCRIPTION

Figure 1:
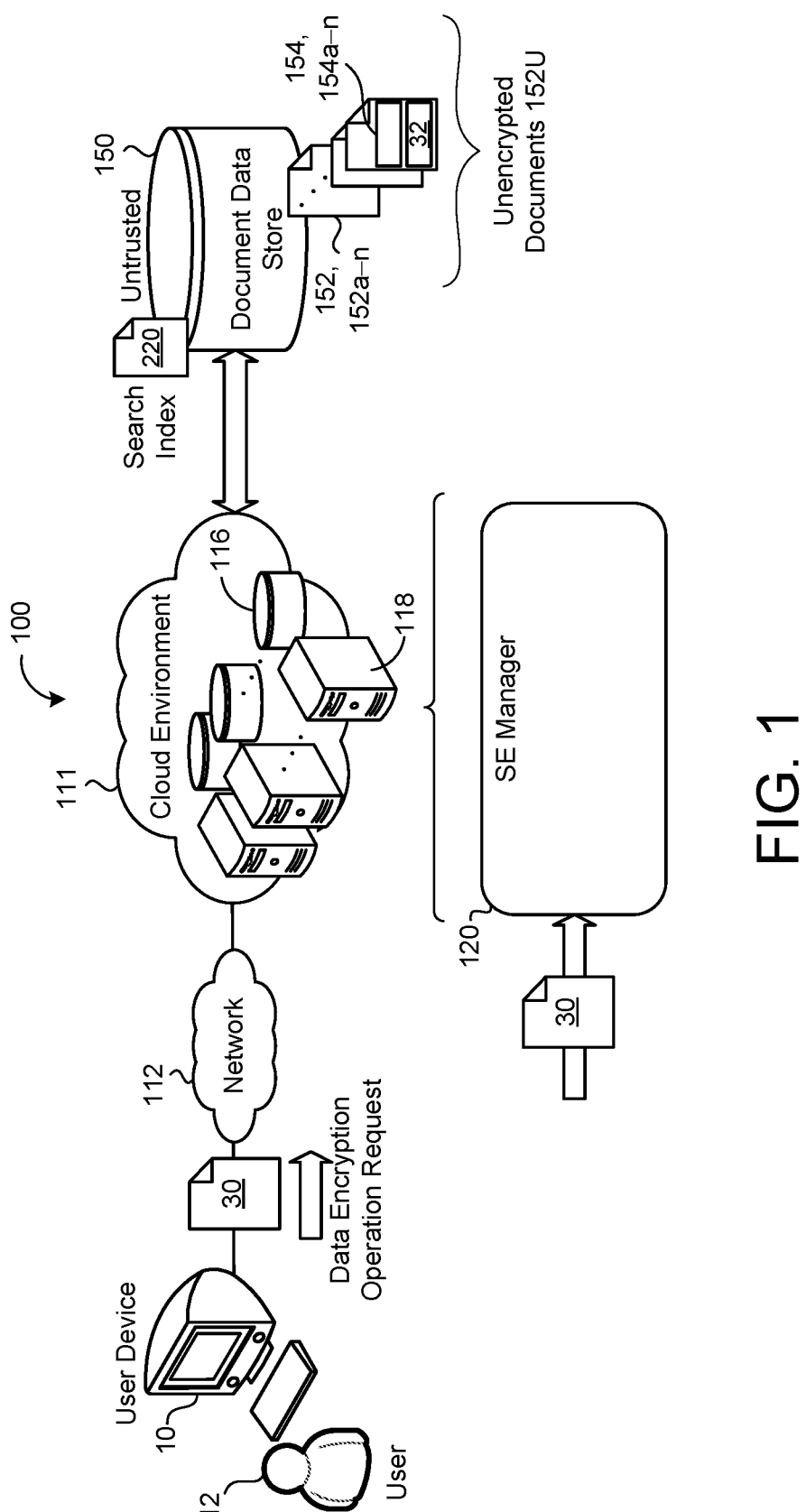
FIG. 1 is a schematic view of an example system for providing searchable encryption with a public key.

Nowadays, more and more users are relying on remote server-based or cloud-based storage systems for storing their data (or content). Naturally, it is important that this data is stored in a secured manner, so as to prevent unauthorized access, use or manipulation by third parties—hence, the data is normally stored in encrypted form. However, this encrypted storage ideally needs to be implemented in a way that (a) enables the authorized or originating user to access and use their data in a convenient manner whilst (b) also maintaining security (both of the data itself and of the cryptographic keys used to secure the data). For example, a user may wish to conduct a search over their data, such as a search to identify "photos of Chris", or a search to identify data based on a date (e.g. data generated on or after a certain date). This could be useful, for example, if the user is using the encrypted storage as a secured data backup and if the user then needs to retrieve a certain portion of their data in order to conduct a restore operation on their local device(s). The present invention aims to facilitate secured implementations for searchable data storage.

In particular, the data provided by a user to a remote storage (e.g. at a server or on the cloud) may be indexed (so as to create a search index) and encrypted using a symmetric key generated at the remote storage. The remote storage may make use of a public key of the user to generate an encrypted index, in which the search index and the symmetric key are stored in encrypted form. The remote storage may then discard or delete the symmetric key. In this way: (i) only the user, who has access to the private key corresponding to the public key, can decrypt the encrypted index; (ii) thus, since the remote storage discarded the symmetric key, it is only the user who can obtain the symmetric key from the encrypted index so as to be able to decrypt encrypted content being stored at the remote storage; (iii) only the user, with their private key, can access the search index and thereby perform their desired search over their encrypted content; and (iv) this process does not rely on the user providing the remote system with the symmetric key (e.g. a password which users may have used for other purposes and which would, therefore, represent a potential security weakness). Consequently, the user's data can be stored in an encrypted form, with the user being enabled to search over their encrypted data and access selected portions of their encrypted data, with this functionality being implemented in a secured manner.

Asymmetric cryptography (also referred to as public-key cryptography) is a popular encryption solution because two parties can securely exchange communications without the need to share a private key. In public-key cryptography, cryptographic algorithms generate a private key and a corresponding public key that produce one-way functions such that data encrypted with the public key may only be decrypted by the associated private key (and vice versa). Thus, an individual may disseminate their public key while keeping their private key secret. Anyone who wishes to communicate securely with the individual may encrypt the communication with the public key, which may then only be decrypted by the private key that the individual has kept secret.

An alternative to asymmetric cryptography is symmetric cryptography. With symmetric cryptography, the same key is used to both encrypt and decrypt the data. This requires two parties who wish to communicate to share the same key, which may raise a number of security concerns. For example, a way must be found to share the symmetric key between the parties secretly. In another example, all data encrypted by the symmetric key will be accessible to all parties with the key, which may limit the use of the symmetric key to a single application and greatly increase the number of keys the user must maintain. Key management, in general, is a difficult and burdensome endeavor and is especially difficult for persistent symmetric keys. However, asymmetric cryptography tends to be much more computationally expensive than symmetric cryptography, especially when the plaintext is very large.

In order to take advantage of the privacy of public-key cryptography and the efficiency of symmetric key cryptography while maintaining search capabilities over a large corpus of encrypted documents, implementations herein are directed toward a searchable encryption manager that implements hybrid encryption to efficiently encrypt a search index with a public key of a client.

Referring to FIG. 1, in some implementations, an example system 100 includes a user device 10 associated with a respective user or client 12 and in communication with a remote system 111 via a network 112. The user device 10 may correspond to any computing device, such as a desktop workstation, a laptop workstation, or a mobile device (i.e., a smart phone). The remote system 111 may be a single computer, multiple computers, or a distributed system (e.g., a cloud environment) having scalable/elastic computing resources 118 (e.g., data processing hardware) and/or storage resources 116 (e.g., memory hardware). A document data store 150 (i.e., a remote storage device 150) is overlain on the storage resources 116 to allow scalable use of the storage resources 116 by one or more of the client or computing resources 118. Optionally, the document data store 150 may reside on a single storage resource 116 in a non-distributed manner. The document data store 150 is configured to store a corpus of documents 152, 152*a-n* associated with the user 12. Each document 152 includes a document identifier 154 that uniquely identifies the associated document 152 (e.g., a document name). Each document 152 also includes a set of keywords 32. The set of keywords 32 includes all keywords that appear in the associated encrypted document 152 that may be searched for by the user 12. As used herein, a document 152 may refer to any item uploaded onto the remote system 111 for storage within the document data store 150, such as, without limitation, emails, calendar events, notes, database entries, pictures, etc.

The document data store 150 may maintain a search index 220 based on keywords 32 in the documents 152 stored on the remote storage device 150 associated with the user 12 or associated with the encryption request 30. For example, the search index 220 may correlate keywords 32 with the document identifiers 154 of the documents 152 that the keyword 32 appears in. The search index 220 may also correlate additional or other metadata with the keywords 32. For example, dates, times, authors, etc. may also be associated with the keywords 32. Accordingly, the user 12 may issue a query for a keyword 32 and the document data store 150 may access the search index 220 to locate all documents 152 stored on the data store 150 and associated with the user 12 that keyword 32 appears in. In some examples, the remote system 111 executes a Searchable Encryption (SE) manager 120 for managing access to the encrypted documents 152 within the data storage 150.

The SE manager 120, in some examples, receives an operation request 30 from the user 12 (via the user device 10 through the network 112) requesting that unencrypted documents 152U associated with the user 12 and stored on the remote storage device 150 be encrypted. The user device 10 may have previously uploaded the documents 152 for storage on the remote storage device 150, and is now sending the operation request 30 to encrypt the unencrypted documents 152U. As used herein, the "unencrypted documents 152U" refer to documents/data stored on the document data store 150 that the remote system 111 can freely inspect in plaintext. In other words, the "unencrypted documents 152U" may be encrypted in the sense that third parties or malicious actors are prevented from viewing in plaintext, but the remote system 111 ultimately maintains access to cryptographic keys for decrypting the documents 152U into plaintext. The encryption request 30, however, includes a request to encrypt some or all of the unencrypted documents 152 associated with the user 12 using searchable encryption so that the user 12 can search for keywords 32 in encrypted documents 152. That is, once encrypted, the remote system 111 or entity operating the remote system 111 no longer has access to viewing the contents of the encrypted documents 152 stored on the document data store 150. The encryption request 30 may also request the SE manager 120 to delete or discard any unencrypted (i.e., plaintext) versions or copies of the documents 152 after encryption. That is, the encryption request 30 may indicate that the user 12 is revoking the remote system's 111 access to any plaintext (e.g., unencrypted) documents 152U stored on the untrusted document data store 150, or otherwise preventing any entity operating the remote system 111 from accessing plaintext documents 152 stored on the untrusted document data store 150.

Figure 2:
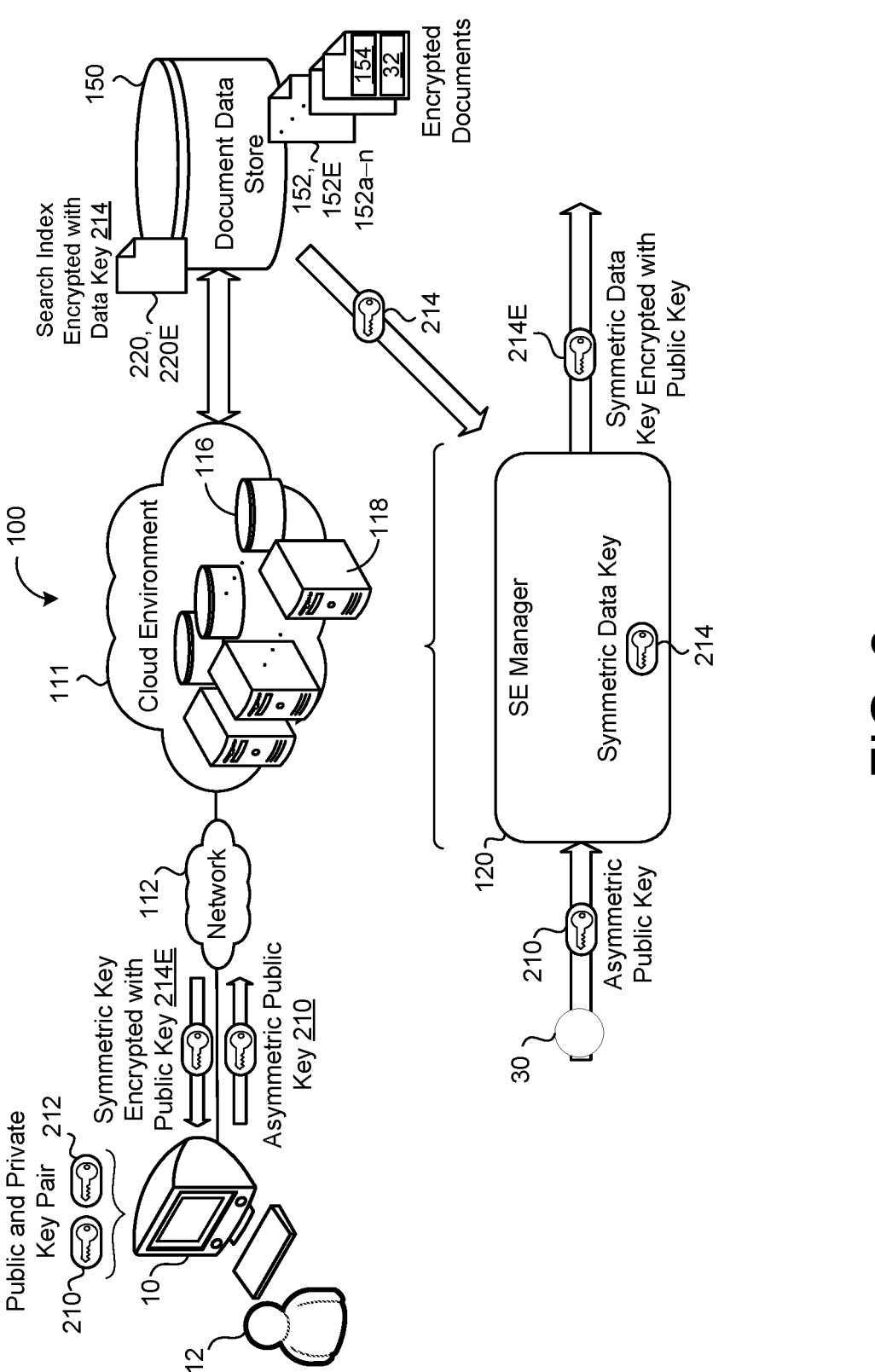
FIG. 2 is a schematic view of the example system of FIG. 1 with an encrypted search index.

Referring now to FIG. 2, the SE manager 120 also receives, from the user device 10, a public key 210. The SE manager 120 may receive the public key 210 and the operation request 30 concurrently or simultaneously. The public key 210 includes an asymmetric cryptographic public key associated with the user 12. That is, the public key 210 is associated with a private key 212 kept secret by the user 12 to implement public-key cryptography such that the SE manager 120 has access to the public key 210 but not the private key 212. The user device 10 may generate the public key 210 and the associated private key 212 locally. The SE manager 120, after receiving the public key 210, generates a random data key 214. The data key 214 is a symmetric cryptographic key. For example, the data key 214 may be an Advanced Encryption Standard Galois/Counter Mode (AES-GCM) key. The data key 214 is random such that the key 214 includes a sequence of numbers that cannot be reasonably predicted better than by random chance. The data key 214 may be generated by, for example, a hardware random-number generator or a pseudo-random number generator executing on the data processing hardware 118 of the remote system 111.

The SE manager 120, using the data key 214, encrypts the search index 220. The encrypted search index 220, 220E includes the search index based on the keywords 32 in the documents 152 stored on the remote storage device 150 associated with the user 12 or associated with the encryption request 30. After encrypting the search index 220E using the random data key 214 generated by the SE manager 120, the SE manager 120 encrypts the data key 214 using the public key 210 received from the user device 10. Once encrypted, the encrypted data key 214E may only be decrypted by the user device using the private key 212 associated with the public key 210 (i.e., the user's private key 212). The private key 212 is unavailable to the SE manager 120 (and the rest of the remote system 111).

The SE manager 120 sends the encrypted data key 214E (encrypted with the public key 210) to the user device 10. The user device 10 may store the data key 214E locally at the user device 10 or elsewhere (e.g., a local or remote third-party key management system). After sending the encrypted data key 214E to the user device 10, the SE manager 120, in some examples, discards the data key 214 used to encrypt the search index 220E. That is, the SE manager 120 discards, deletes, and/or removes any unencrypted copies or versions of the data key 214 such that the SE manager 120 no longer has access to unencrypted or plaintext versions the data key 214. In this way, the remote system 111 no longer has access to viewing the contents of the encrypted search index 220E. In some examples, the encrypted data key 214E, when received by the user device 10, causes the user device 10 to decrypt the encrypted data 214E key using the private key 212, which is not accessible to the remote system 111.

In some implementations, the SE manager 120 also encrypts the documents 152 with the data key 214 randomly generated by the SE manager 120. In other implementations, the SE manager 120 generates a second random data key 214 and encrypts the documents 152 with the second data key 214. In this case, the SE manager 120 also encrypts the second data key 214 with the public key 210 and sends the second data key to the user device 10. In yet other examples, the documents 152 are encrypted with an asymmetric key, as the encryption of the documents 152 may be completely separate and independent from the encryption of the search index 220. Thus, the SE manager 120 may encrypt the documents 152 before or after encrypting the search index 220, or the SE manager 120 may encrypt the documents 152 and the search index 220 concurrently. Regardless of the key used, after encryption of the documents 152, the SE manager 120 may remove or delete any unencrypted or plaintext copies of the documents 152 such that the remote system 111 no longer has plaintext access to the documents 152 while storing the encrypted documents 152E on the untrusted document data store 150.

In some examples, the user 12 may request the SE manager 120 to encrypt multiple different repositories of data, such that the SE manager 120 encrypts each repository with a different respective symmetric data key 214 generated by the SE manager 120 and then encrypts each respective symmetric data key 214 the same asymmetric public key 210. In this way, using the client-side private key 212 associated with the public key 210, only trusted user device 10 can decrypt the encrypted symmetric data keys 214 to access the repositories of data in plaintext. For example, the user 12 may request the creation of a new encrypted repository after a threshold period of time (e.g., six months). The user 12 may then generate a search query 310 (FIG. 3) for each repository by using the associated decrypted symmetric data key 214 (FIG. 3).

Figure 3:
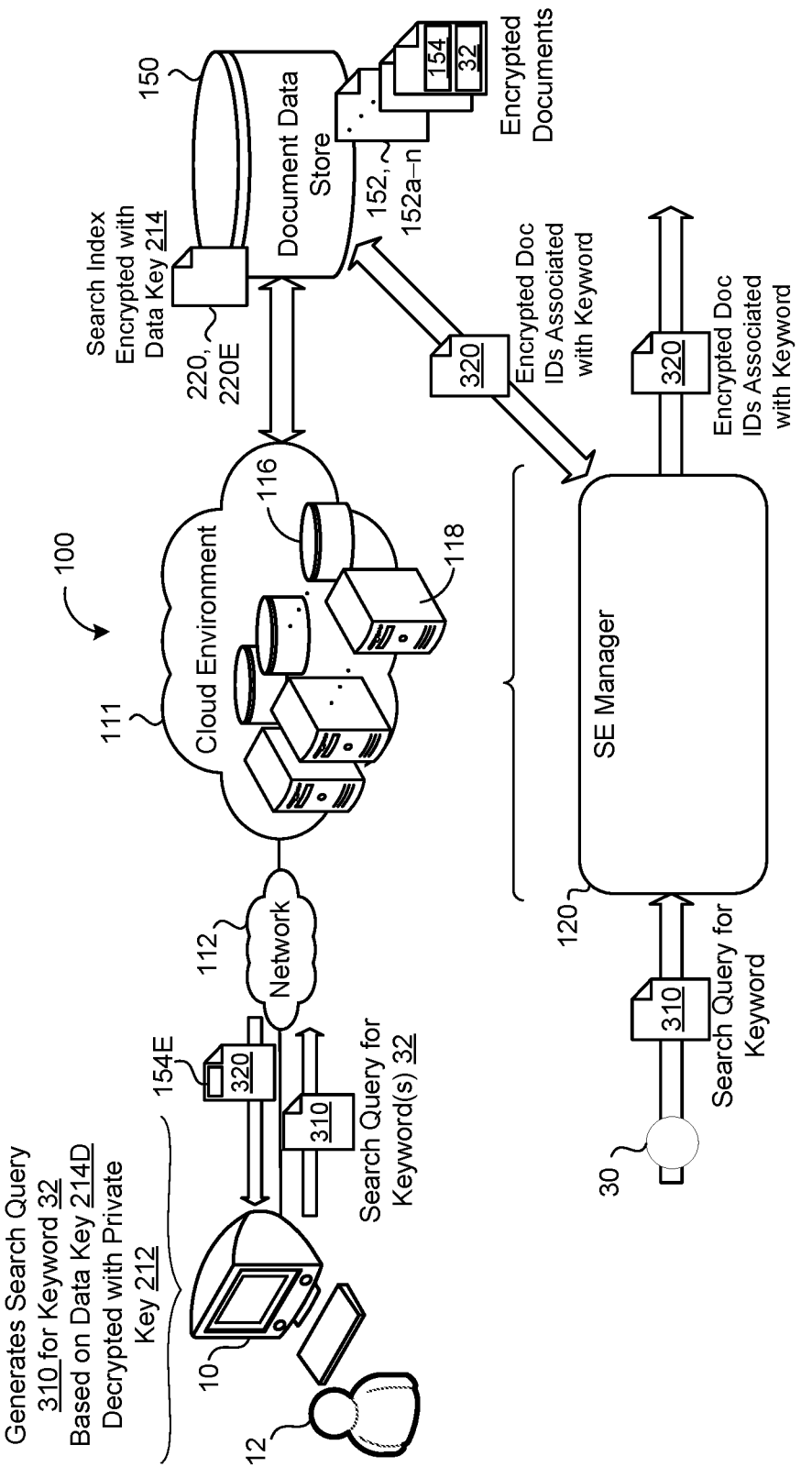
FIG. 3 is a schematic view of the example system of FIG. 1 with a search query for a keyword.

Referring now to FIG. 3, in some implementations, after sending the encrypted data key 214E to the user 12, the SE manager 120 receives a search query 310 for one or more keywords 32 from the user device 10. In some examples, the remote system 111 maintains the encrypted data key 214E and the user 12 downloads or otherwise retrieves the encrypted data key 214E from the remote system 111 prior to generating the search query 310. That is, instead of sending the encrypted data key 214E to the user 12, the SE manager 120 maintains the encrypted data key 214E for the user 12 at the remote system 111 and removes any plaintext versions of the data key 214. The user may then retrieve the encrypted data key 214E (e.g., after authentication of the user 12) from any user device 10 the user 12 has access to whenever the user 12 desires to search the documents 152.

The user device 10 uses the public key 212 to decrypt the encrypted data key 214E and then uses the decrypted data key 214D for generating the search query 310 for the one or more keywords 32. In some implementations, the user device 10 employs encrypted search techniques as described in U.S. Application No. 62/838,111, filed Apr. 24, 2019, titled "Response-Hiding Searchable Encryption," and U.S. application Ser. No. 16/712,151, filed Dec. 12, 2019, titled "Encrypted Search with No Zero-Day Leakage," which are both hereby incorporated by reference in their entireties.

Thereafter, the user device 10 sends/transmits the generated search query 310 based on the decrypted data key 214D to the SE manager 310 and the SE manager 310 applies the search query 310 to the encrypted search index 220 to ultimately return the document identifiers 154 associated with documents 152 that the keyword 32 appears in. After receiving the search query 310, the SE manager 120 accesses the encrypted search index 220E and generates a SE result 320 that the user device 10 uses to obtain the document identifiers 154 associated with the keyword(s) 32 of the search query 310. For example, the search query 310 generated by the user device 10 based on the decrypted data key 214 allows the SE manager 120 to access the encrypted search index 220 and generate the SE result 320 based on the document identifiers 154 associated with the keywords(s) 32 of the search query 310 without revealing the document identifiers 154 or the keywords 32 in plaintext to the remote storage device 150. In some examples, the SE result 320 includes encrypted document identifiers 154E that the user device 10 may decrypt using the private key 212. Additionally or alternatively, the SE result 320 may include additional metadata (e.g., data, time, author, subject, etc.) that the user device 10 may decrypt using the private key 212. In the example shown, the client device 10 receives the SE result 320 from the SE manager 120 and uses the private key 212 to obtain the document identifiers 154 associated with documents 152 that the keyword 32 of the search query 310 appears in. That is, the SE result 320 may include cryptographic hashes/functions associated with the document identifiers 154 and/or additional metadata, and the user device 10 may use the private key 212 to construct/generate the document identifiers 154 and/or the additional metadata in plaintext. Each document identifier 154 uniquely identifies a respective one of the encrypted documents 152 that the keyword 32 appears in and stored on the remote storage device 150. The user 12 may generate the data encryption operation request 30 and/or the search query 310 via a software application executing on the user device 10. A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications. For example, the user may execute a web browser executing on the user device 10 that communicates with the remote system 111 via the network 112.

FIG. 4 provides an example arrangement of operations for a method 400 for encrypted search with a public key. At block 402, the method 400 includes receiving, at data processing hardware 118, an operation request 30 from a user device 10 associated with a user 12 requesting encryption of data associated with the user 12. The data includes a corpus of documents 152U stored on a remote storage device 150 in communication with the data processing hardware 118. The method 400, at block 404, includes receiving, at the data processing hardware 118, a public key 210 associated with the user 12. The public key 210 is an asymmetric cryptographic public key.

At block 406, the method 400 includes generating, by the data processing hardware 118, a random data key 214. The data key 214 is a symmetric cryptographic key. At block 408, the method 400 includes encrypting, by the data processing hardware 118, using the data key 214, a search index 220 for the corpus of documents 152 based on keywords 32 within the corpus of documents 152. The method 400, at block 410, includes encrypting, by the data processing hardware 118, using the public key 210 associated with the user 12, the data key 214. At block 412, the method 400 includes sending, by the data processing hardware 118, the encrypted data key 214E to the user device 10 associated with the user 12. In some examples, the method 400 includes, after sending the encrypted data key 214, discarding, by the data processing hardware 118, the data key 214.

Figure 5:
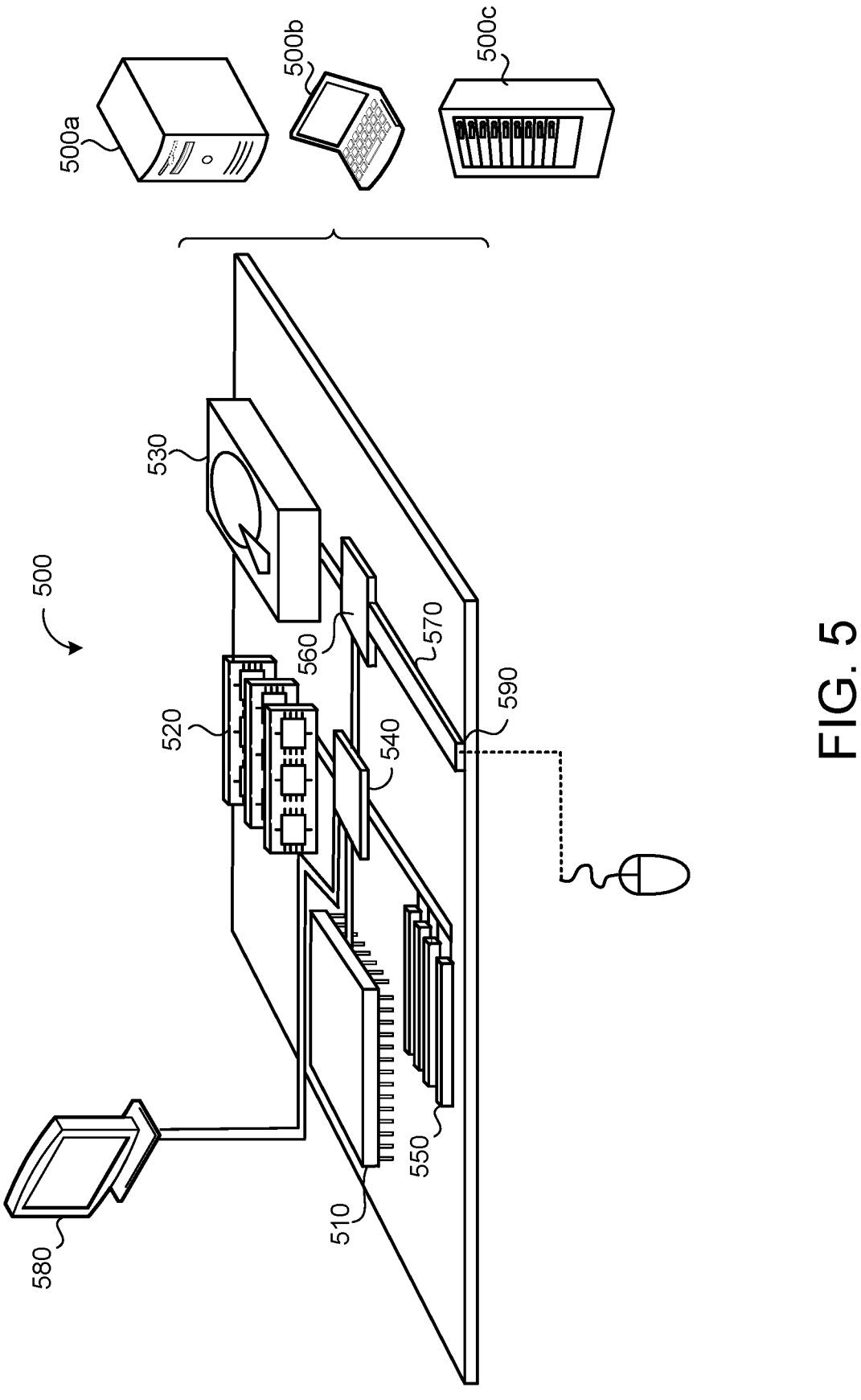
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory

520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

12

What is claimed is:

1. A computer-implemented method when executed on data processing hardware causes the data processing hardware to perform operations comprising:
   storing unencrypted data at a remote storage device in communication with the data processing hardware without encrypting the data, the data associated with a user;
   after storing the data at the remote storage device, subsequently receiving an operation request from a user device associated with the user, the operation request requesting both encryption of the data previously stored at the remote storage device and requesting that any unencrypted versions of the data after encryption be discarded;
   receiving a key associated with the user, the key comprising an asymmetric key;
   generating a random data key, the random data key comprising a symmetric cryptographic key;
   encrypting, using the random data key, a search index for the data;
   encrypting, using the random data key, the data associated with the user;
   encrypting, using the key associated with the user, the random data key; and
   discarding the random data key.

2. The method of claim 1, wherein the key associated with the user comprises an asymmetric cryptographic public key.

3. The method of claim 2, wherein receiving the key associated with the user comprises receiving the asymmetric cryptographic public key from the user device concurrently with the operation request.

4. The method of claim 1, wherein the operations further comprise sending the encrypted random data key to the user device associated with the user.

5. The method of claim 4, wherein the user device is configured to decrypt the encrypted random data key using a private key associated with the key associated with the user, the private key comprising an asymmetric cryptographic private key inaccessible to the data processing hardware.

6. The method of claim 1, wherein the data associated with the user comprises a corpus of documents stored on the remote storage device in communication with the data processing hardware.

7. The method of claim 6, wherein the operations further comprise, prior to receiving the operation request:
   receiving the corpus of documents uploaded by the user device;
   storing the corpus of documents on the remote storage device; and
   generating a second search index for the corpus of documents stored on the remote storage device based on keywords within the corpus of documents.

8. The method of claim 6, wherein the operations further comprise, prior to encrypting the random data key with the key associated with the user, encrypting, using the random data key, the corpus of documents.

9. The method of claim 1, wherein the operations further comprise, in response to receiving the operation request:
   generating a second random data key, the second random data key comprising a second symmetric cryptographic key; and
   encrypting, using the key associated with the user, the second random data key.

10. The method of claim 1, wherein the random data key comprises an Advanced Encryption Standard Galois/Counter Mode (AES-GCM) key.

11. A system comprising:

data processing hardware; and memory hardware in communication with the data processing hardware, the memory hardware storing instructions that when executed on the data processing hardware cause the data processing hardware to perform operations comprising:

storing unencrypted data at a remote storage device in communication with the data processing hardware without encrypting the data, the data associated with a user;

after storing the data at the remote storage device, subsequently receiving an operation request from a user device associated with the user, the operation request requesting both encryption of the data previously stored at the remote storage device and requesting that any unencrypted versions of the data after encryption be discarded;

receiving a key associated with the user, the key comprising an asymmetric key;

generating a random data key, the random data key comprising a symmetric cryptographic key;

encrypting, using the random data key, a search index for the data;

encrypting, using the random data key, the data associated with the user;

encrypting, using the key associated with the user, the random data key; and discarding the random data key.

12. The system of claim 11, wherein the key associated with the user comprises an asymmetric cryptographic public key.

13. The system of claim 12, wherein receiving the key associated with the user comprises receiving the asymmetric cryptographic public key from the user device concurrently with the operation request.

14. The system of claim 11, wherein the operations further comprise sending the encrypted random data key to the user device associated with the user.

15. The system of claim 14, wherein the user device is configured to decrypt the encrypted random data key using a private key associated with the key associated with the user, the private key comprising an asymmetric cryptographic private key inaccessible to the data processing hardware.

16. The system of claim 11, wherein the data associated with the user comprises a corpus of documents stored on the remote storage device in communication with the data processing hardware.

17. The system of claim 16, wherein the operations further comprise, prior to receiving the operation request:

receiving the corpus of documents uploaded by the user device;

storing the corpus of documents on the remote storage device; and generating a second search index for the corpus of documents stored on the remote storage device based on keywords within the corpus of documents.

18. The system of claim 16, wherein the operations further comprise, prior to encrypting the random data key with the key associated with the user, encrypting, using the random data key, the corpus of documents.

19. The system of claim 11, wherein the operations further comprise, in response to receiving the operation request:

generating a second random data key, the second random data key comprising a second symmetric cryptographic key; and encrypting, using the key associated with the user, the second random data key.

20. The system of claim 11, wherein the random data key comprises an Advanced Encryption Standard Galois/Counter Mode (AES-GCM) key.

\* \* \* \* \*